S. W. PUTNAM, 3D.
TAIL STOCK CLAMPING MEANS.
APPLICATION FILED APR. 30, 1912.
1,042,369.
Patented Oct. 22, 1912.
2 SHEETS—SHEET 1.
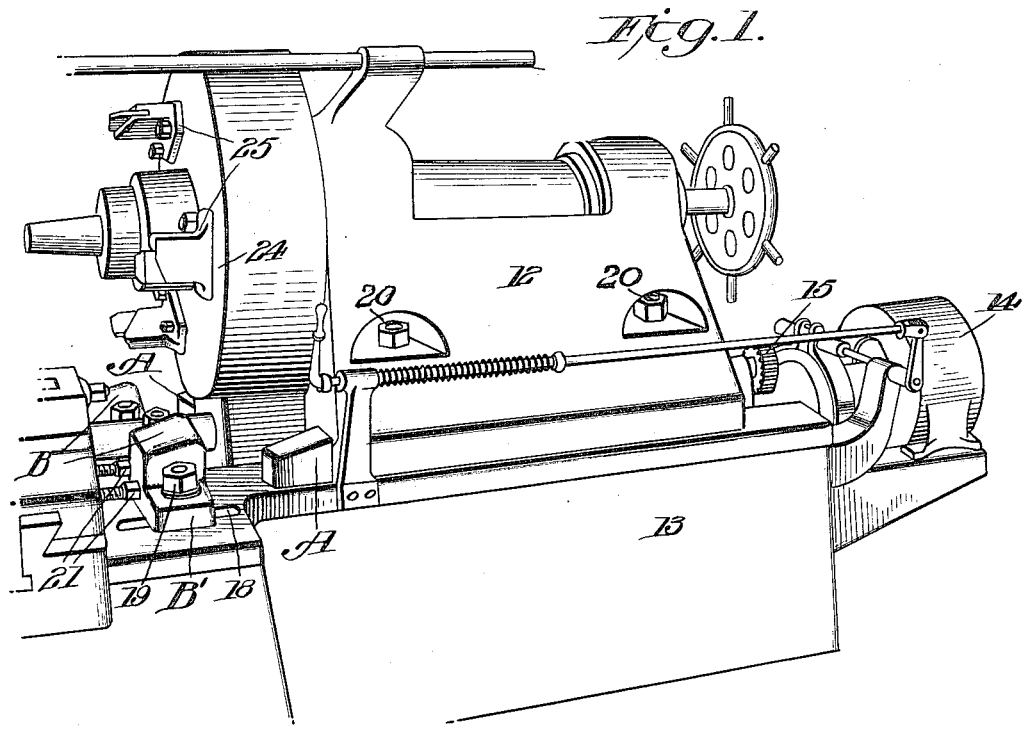
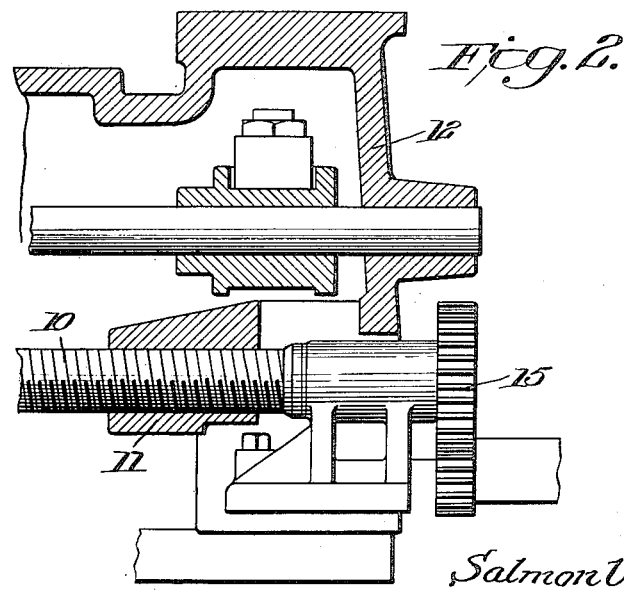
Witnesses
C. P. Walker
G. Manning
Inventor
Salmon W. Putnam, 3d
By T. Walter Fowler
Attorney

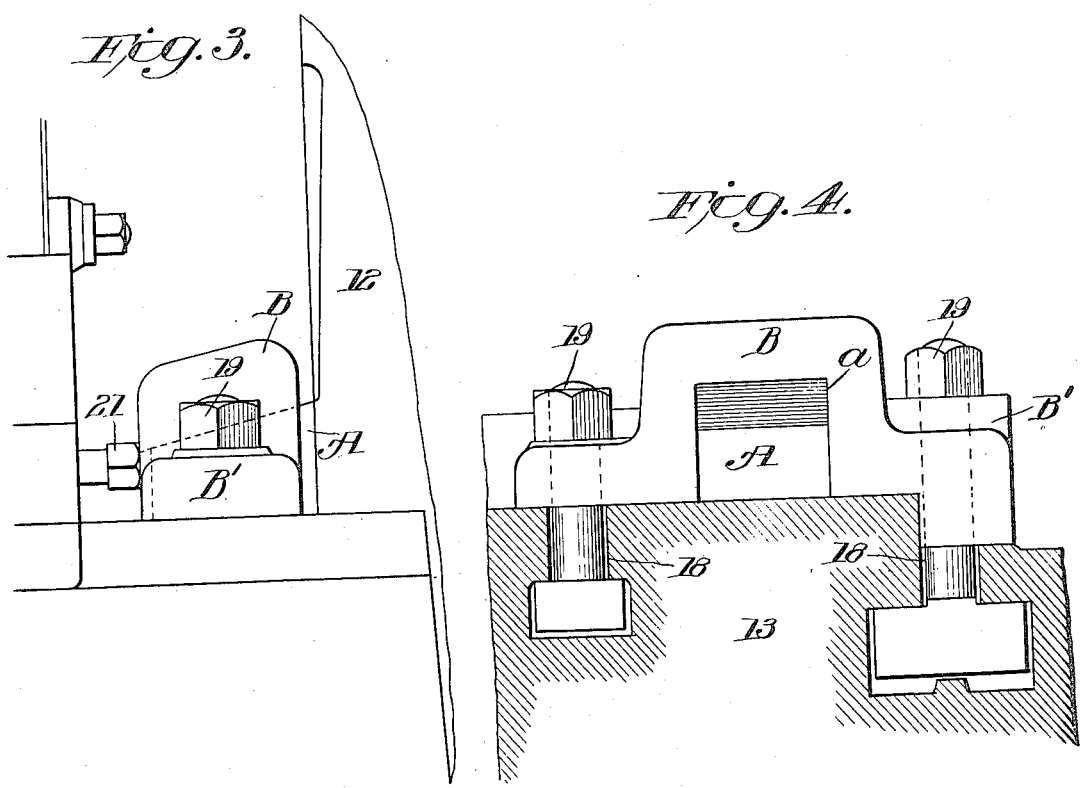
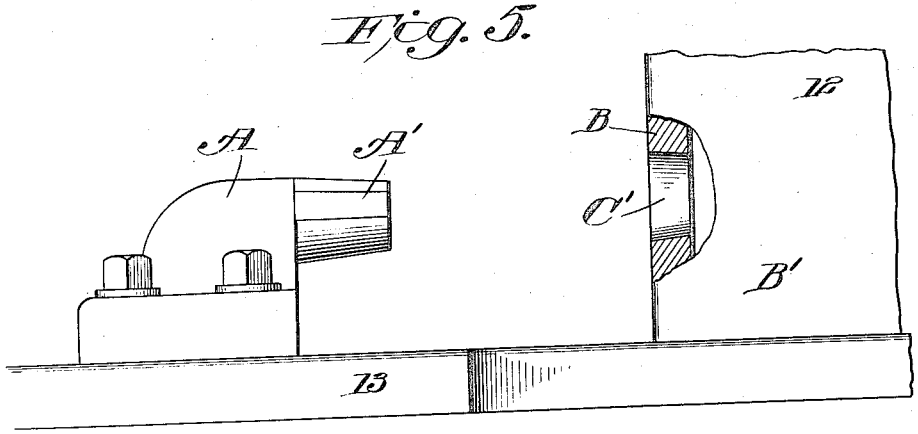

UNITED STATES PATENT OFFICE.

SALMON WILDER PUTNAM, 3D, OF FITCHBURG, MASSACHUSETTS.

TAIL-STOCK-CLAMPING MEANS.

1,042,369.

Specification of Letters Patent.

Patented Oct. 22, 1912.

Application filed April 30, 1912. Serial No. 694,130.

*To all whom it may concern:*

Be it known that I, SALMON W. PUTNAM, 3d, a citizen of the United States, residing at Fitchburg, in the county of Worcester and State of Massachusetts, have invented certain new and useful Improvements in Tail-Stock-Clamping Means, of which the following is a specification.

This invention relates to certain new and useful means for clamping the tailstock of a lathe, or like part of a corresponding machine rigidly to the bed of the machine at any predetermined location; in its more restricted form the mechanism relates to a certain automatic means for clamping the tailstock of a lathe at any predetermined location; in doing this the invention meets the operating conditions with great saving of time demanded in that class of machinery commonly known and classed as double driving-wheel lathes, coach and truck-wheel lathes and steel-tire-turning lathes.

While the invention is particularly useful in association with the tailstock of the heavy machines above referred to, the salient features of the invention are not limited to this particular type of machinery as it is quite apparent that the automatic means for effecting the clamping of the tailstock, or corresponding part of a machine, to the bed of the machine is applicable to all other classes of machinery having a portion corresponding to the tailstock of a lathe and which is designed to have a longitudinal movement along the bed of the machine.

In the class of machinery referred to, the tendency for the tailstock to lift off of the bed due to the action of the cutting tools, is very great, as these cutting tools are often subjected to a working pressure approaching seventy-five tons when cutting, and in order to make a machine efficient and capable of a large output, it is desirable to provide some simple automatic and positive means of clamping the tailstock to the bed against the lifting action of the cutting tools, it being understood that this clamping must be done each time the work is changed, said work being in the class of machinery above named, the wheels to be turned, regardless of whether these wheels are mounted upon axles or held in workable position by temporary means.

The main object of the present invention is to supply a simple and automatic means of clamping the tailstock rigidly to the bed at any predetermined location so as to meet operating conditions, and to save time in effecting the necessary adjustment, and with this and other objects in view, the invention consists of the parts and the constructions, arrangements and combinations of parts and their equivalents, which are hereinafter described and claimed.

In the accompanying drawings forming part of this specification and in which similar reference characters indicate like parts in the several views; Figure 1 is a perspective view of the tailstock portion of a turning lathe embodying, in one form, the salient features of my invention. Fig. 2 is a part elevation and part longitudinal sectional view of a portion of a tailstock. Fig. 3 is an enlarged view of part of the tailstock showing one form of engageable means for automatically clamping the tailstock to the bed of the machine. Fig. 4 is a front elevation of Fig. 3. Fig. 5 illustrates a modified form of means for clamping the tailstock to the bed of the machine.

In the class of machinery hereinbefore referred to, in order to meet the modern operating conditions, it is necessary to provide a means of longitudinal movement of the tailstock along the bed of the machine, and to this end various methods have heretofore been employed to accomplish the desired purpose; these means have included a straight hand movement by human impulse; a rack and pinion, by hand or power; compressed air; and screw and nut, by hand or power. For my present purpose, I prefer to use a screw-shaft, 10, and a nut, 11, engaged thereby for accomplishing the desired movement of the tailstock, 12, said screw being suitably connected with and operated by an individual electric motor, of any of the well known and approved types. These features, however, form no part of my present invention.

Referring to Fig. 1, wherein is shown a specific application of my invention to a well known form of metal-turning lathe, it will be noted that the movement of the tailstock, 12, along the bed, 13, of the machine is accomplished by the electric motor, 14, engaging by suitable gearing, 15, the screw-shaft, 10, which in turn engages the usual nut, 11, under the tailstock and which ordinarily is integral therewith. The result of this arrangement is that the rotation of the screw-shaft produces longitudinal motion of the tailstock along the bed, the direction of said motion being, of course, relative to the direction of rotation of the screw shaft, which by virtue of the motor being operable in both directions, will produce both directions of rotation of the screw-shaft, thereby operating the tailstock in a forward and backward direction.

The essence of the present invention is in the employment of automatic means between the tailstock and the bed of the machine for clamping the tailstock to the bed at any predetermined location and a means well suited for the purpose comprises the following: On the front end of the tailstock is an extended foot or portion, A, having an upper surface tapered with respect to the bottom and to the plane in which the tailstock is movable, said foot being of suitable proportion and strength and adapted to co-act with a socketed block, B, suitably fixed to the bed of the machine in line with the aforesaid foot. The block is formed with an opening or socket, a, substantially conforming to the extended foot, A, and adapted to receive the latter; in other words the opening or socket in the block allows the foot to project into it with the inclined upper surface of the foot engaging a corresponding inclined upper wall of the opening or socket thus producing a certain wedging action as the foot is moved, in one direction, relatively to the block, and causing the tailstock to be forced downwardly into clamping engagement with the bed of the machine and clamping the tailstock fixedly in position. These parts, or their equivalent, are duplicated at opposite sides of the machine and hence when the tailstock has been moved by the screw-shaft, 10, engaging the customary nut and the front ends of the extended feet, A, are thrust into the openings or sockets in the blocks, B, and which openings are always in line with and presented toward the feet, there will be a gradual and yet powerful forcing of the bottom of the tailstock down upon the bed of the machine in which position the tailstock remains during the cutting function.

The blocks, B, have laterally extending base flanges, B', which rest upon the bed of the machine, and through these flanges and through appropriate slots, 18, formed in the bed of the machine, pass the bolts, 19, these bolts being, if desired, of the usual T-bolt construction, and the slots being of corresponding T-form in cross section whereby the bolts may be turned or tightened to bring about sufficient tension to cause the blocks, B, to act as a stop or abutment arresting the longitudinal movement of the tailstock when co-action of surfaces is obtained, and by virtue of this co-action to create the downward pressure of the tailstock on the bed, producing thereby the desired binding or clamping effect.

While the foregoing is the construction I prefer to use, it is obvious that other means may be employed for holding the blocks, B, in place without departing from the spirit of the invention, and which latter comprises, broadly, the conjoint action of a tapered male and a co-acting socket or female member adapted to receive said male member and to automatically cause the tailstock to be clamped rigidly to the bed of the lathe when said mail member and socket or female member, one of which is carried by the tailstock and the other is fixed to the bed, are caused to move in contact one relatively to the other.

From the foregoing it will be understood that when the tailstock is operated to the left of Fig. 1, it will bring the foot or male member, A, into engagement with the corresponding socket formed in the block, or female member, B, and as the inclined surfaces of these two parts ride one on the other, there is automatically produced a decided downward binding effect on the tailstock, and the latter is thereby clamped to the bed of the machine without other movement or adjustment being necessary. It is equally apparent that the arrangement and construction of the parts, A and B, may not be the same at opposite sides of the machine provided there is always present the wedge-like foot, or male member, on one part and the corresponding socket, or female member, on the other part operating as before described.

If the tailstock is in its clamped position and is operated so that it will move longitudinally to the right of Fig. 1, this action will result in a release of the clamping effect on the tailstock and the latter will now be free to slide under the tension of the usual screws, 20, or other similar means. It will also be observed that ample provision is made by the bolts, 19, and slots, 18, before mentioned for adjusting the location of the blocks longitudinally with respect to the bed of the machine to thereby permit of variable location of the tailstock with respect to the bed; to preclude the possibility of disturbing the position of the blocks when once adjusted and when the tapering foot, A, is forced into its wedging engagement with the socket of the block, B, by motion longitudinally of the tailstock, suitable bolts, 21, or other abutments fixed to some rigid or immovable part of the machine and backing up against the blocks may be employed. These bolts or abutments are, however, not necessary, but I prefer to use them in such heavy machines as I have hereinbefore described.

It is, of course, obvious that a reversal of location of elements corresponding substantially to the male member or foot, A, and female member, of block, B, will accomplish an exactly similar result and accordingly is within the scope of the present invention. One instance of such reversal is shown in Fig. 5, where the male member of the two co-acting parts is in the form of a projection, A', integral with the block, B', which is rigidly bolted to the bed of the machine, such projection adapted to enter a corresponding hole, C', formed in the tailstock. This hole in practice is bored with a taper and the portion of the projection, A', below the horizontal center thereof corresponds with the taper of the hole; the portion of the projection, A', above the horizontal center is cut away or reduced from its true conical shape to insure that when this projecting part enters the tapered hole, C', in the tailstock, that portion of the projection below the horizontal center will so engage the corresponding tapered wall of the hole as to create a pressure downward on the tailstock, thereby clamping the tailstock to the bed. It will thus be seen that in this modified construction the male member of the co-acting clamping parts is on the bed and the female member is on the tailstock; in Fig. 1, the male member is represented by the foot, A, and is carried by the tailstock, while the female member represented by the socket of the block is fixed to the bed.

From the foregoing description it will be apparent that I have devised a simple and at the same time automatic means of clamping a tailstock or like part rigidly to the bed of a lathe or other machine, at any predetermined location and that by so doing I may meet the operating conditions, with great saving of time demanded in the class of machines hereinbefore mentioned, and that in accomplishing this purpose I have also overcome the tendency of the tailstock to lift off of the bed due to the action of the cutting tools and I have consequently reduced the labor required for adjusting the parts and have increased the production of the machine and have reduced the cost of manufacture of the wheels and like parts which are turned on lathes and machines of the character specified.

The tailstock will be supplied with the usual accessories and these will include the face plate, 24, with its dogs, 25, for gripping the work, but these parts are not of the essence of the present invention.

Having thus described my invention what I claim as new and desire to secure by Letters Patent is:—

1. In a machine of the character described, having a fixed bed and a part movably mounted thereon, a means for clamping said movable part to the fixed part, said means comprising a male member on one of said parts and a corresponding female member on the other part, one of said members having a sloping surface engaged by the other member and said members operating conjointly to produce a downward clamping action of the movable part on said fixed part.

2. In a machine of the character described, the combination of a fixed part and a part movably mounted thereon, one of said parts having a male member of substantially wedge-shaped form, and the other part having a corresponding female member to receive said male member whereby when one of said members is moved relative to the companion member, said movably mounted part is forced into clamping engagement with the fixed part.

3. In a machine of the character described, the combination with a fixed bed and a tailstock movably mounted thereon, of a projection on one of said parts and a tapered socket fixed to the other part and adapted to receive said projection, the engaging surfaces of the two parts co-acting as one is moved relatively to the other, to automatically clamp the tailstock to said bed.

4. In a machine of the character described, having a bed and a tailstock movably mounted thereon, a pair of co-acting elements one fixed to the bed and the other to the tailstock, one of said elements adapted to ride in contact with the other, said elements having co-acting wedging surfaces whereby during the forward advance of the tailstock said tailstock is automatically forced downwardly into clamping engagement with said bed.

5. In a machine of the character described, the combination with a bed and a tailstock movably mounted thereon, of a foot projecting from the tailstock proximate the bed, and having one of its surfaces inclined, and a block fixed to the bed and having a socket with an inclined wall substantially corresponding to the inclined surface of the foot whereby during the forward movement of the tailstock said inclined surfaces ride in engagement and the tailstock is forced downwardly into clamping engagement with the bed.

6. In a machine of the character described, the combination with a bed and a tailstock movably mounted thereon, of a foot projecting from the tailstock proximate the bed, and having one of its surfaces inclined, and a block fixed to the bed and having a socket with an inclined wall substantially corresponding to the inclined surface of the foot whereby during the forward movement of the tailstock said inclined surfaces ride with engagement and the tailstock is forced downwardly into clamping engagement with the bed, said block being adjustable on the bed whereby the clamping function may be predetermined.

7. In a machine of the character described, the combination with a bed and a tailstock movably mounted thereon, of a foot projecting from the tailstock proximate the bed, and having one of its surfaces inclined, and a block fixed to the bed and having a socket with an inclined wall substantially corresponding to the inclined surface of the foot whereby during the forward movement of the tailstock said inclined surfaces ride in engagement and the tailstock is forced downwardly into clamping engagement with the bed, and means for adjustably securing the block to the bed, said means including bolts passing through the block and bed, said bed having slots to receive said bolts.

In testimony whereof I affix my signature in presence of two witnesses.

SALMON WILDER PUTNAM, 3D.

Witnesses:
   ALFRED C. ANDERSON,
   MINOT R. STEUART.